United States Patent
Feng et al.

(10) Patent No.: US 8,526,769 B1
(45) Date of Patent: Sep. 3, 2013

(54) HIGH SPEED OPTICAL TRANSMITTER PRODUCING MODULATED LIGHT SIGNALS

(75) Inventors: Dazeng Feng, El Monte, CA (US); Shashank Jatar, Pasadena, CA (US); Mehdi Asghari, Pasadena, CA (US)

(73) Assignee: Kotura, Inc., Monterey Park, CA (US)

(*) Notice: Subject to any disclaimer, the term of this patent is extended or adjusted under 35 U.S.C. 154(b) by 66 days.

(21) Appl. No.: 13/385,780

(22) Filed: Mar. 5, 2012

(51) Int. Cl.
| G02F 1/035 | (2006.01) |
| G02F 1/295 | (2006.01) |
| G02F 1/01 | (2006.01) |
| G02B 6/125 | (2006.01) |
| B29D 11/00 | (2006.01) |

(52) U.S. Cl.
USPC .................................. 385/2; 359/245

(58) Field of Classification Search
USPC .......... 385/2, 3, 4, 8, 14, 16; 359/245–248, 359/254, 315
See application file for complete search history.

(56) References Cited

U.S. PATENT DOCUMENTS

| 5,867,615 | A * | 2/1999 | Shi ..................................... 385/3 |
| 6,552,838 | B2 * | 4/2003 | Ransijn et al. ................ 359/245 |
| 7,136,595 | B2 * | 11/2006 | Aoki et al. ..................... 398/183 |
| 8,027,552 | B2 * | 9/2011 | McNie et al. ................... 385/14 |
| 8,195,011 | B2 * | 6/2012 | Goldring et al. ................ 385/2 |
| 8,447,145 | B2 * | 5/2013 | Goldring et al. ................ 385/2 |
| 8,467,634 | B2 * | 6/2013 | Sugiyama ....................... 385/2 |
| 2011/0142390 | A1 * | 6/2011 | Feng et al. ...................... 385/2 |
| 2011/0158576 | A1 * | 6/2011 | Kissa et al. ..................... 385/3 |
| 2012/0294563 | A1 * | 11/2012 | Thomson et al. ............... 385/2 |

* cited by examiner

*Primary Examiner* — Akm Enayet Ullah
(74) *Attorney, Agent, or Firm* — Gavrilovich, Dodd & Lindsey, LLP

(57) ABSTRACT

An optical system includes modulators positioned on a base. Each modulator includes a modulator waveguide that receives a light signal and guides the received light signal through the modulator. The system also includes drive electronics in electrical communication with the modulators. The drive electronics apply electrical energy to each of the modulators such that an electrical field is generated within the modulator waveguide so as to modulate one of the light signals into a modulated signal. The system includes multiple drive paths that each has a length from a contact pad on the drive electronics to a location where the electrical field is formed in one of the modulator waveguides. The modulators are configured such that the drive path length for each of the modulators is less than 0.5 mm.

18 Claims, 4 Drawing Sheets

HIGH SPEED OPTICAL TRANSMITTER PRODUCING MODULATED LIGHT SIGNALS

FIELD

The present invention relates to optical devices and particularly, to optical transmitters.

BACKGROUND

Optical systems are increasingly being used for a variety of applications such as communications and communications between electrical devices such as servers. These networks make use of transmitters that generate the light signals at one of the electrical devices. In some instances, these transmitters modulate the light signals at high speeds on the order of 25 GHz. As the use of these transmitters has increased, it has become desirable to increase the number of light signals produced by a single device. Increasing the number of light signals produced by a single transmitter can increase the distance between different features of the transmitter. This increased distance can slow down the possible modulation speed of the light signals and increase the size of the device. As a result, there is a need for a compact transmitter that can generate multiple light signals that are each modulated at high speed.

SUMMARY

An optical system includes a transmitter having waveguides defined in a layer of a light-transmitting medium positioned on a base. A portion of the waveguides are transition waveguides that each guides a different transition light signal. The transmitter also includes modulators positioned on the base. Each modulator includes a modulator waveguide that receives one of the transition light signals and guides the received transition light signal through the modulator. The system also includes drive electronics in electrical communication with the modulators. The drive electronics apply electrical energy to each of the modulators such that an electrical field is generated within the modulator waveguide. Each electrical field is generated so as to modulate one of the transition light signals into a modulated signal. The system includes multiple drive paths. A drive path length is the length of an electrical path from a contact pad on the drive electronics to a location where the electrical field is formed in one of the modulator waveguides. The modulators are constructed and arranged on the transmitter such that the drive path length for each of the modulators is less than 0.5 mm.

BRIEF DESCRIPTION OF THE FIGURES

FIG. 2A through FIG. 2C illustrate a transmitter that is suitable for use as a transmitter in a system such as the system of FIG. 1A. FIG. 2A is a topview of the transmitter.

FIG. 2B is a sideview of the transmitter taken looking in the direction of the arrow labeled B in FIG. 2A.

FIG. 2C is a cross-section of the transmitter taken along the line labeled C in FIG. 2A.

DESCRIPTION

A transmitter includes a multiple modulators positioned along an edge of the transmitter. Each of the modulators is configured to guide a different light signal through a modulator waveguide. The transmitter is used in conjunction with off board modulator driver electronics that are configured to generate an electrical field in each of the modulator waveguides. The modulator driver electronics generate the electrical fields such that the different light signals are each modulated at a rate of at least 25 GHz. In order to efficiently operate modulators at these speeds, the electrical path from contact pads on the modulator driver electronics to the location where the electrical field in the modulator waveguides must have a length of less than 0.5 mm. When prior modulator structures are combined with large numbers of modulators and off board modulator driver electronics, these drive path lengths become very difficult to achieve. The structure of the modulators in the disclosed transmitter combined with the arrangement of the modulators on the transmitter allow these drive path lengths to be achieved even when a large number of modulators are present on a single transmitter.

Figure 1A:
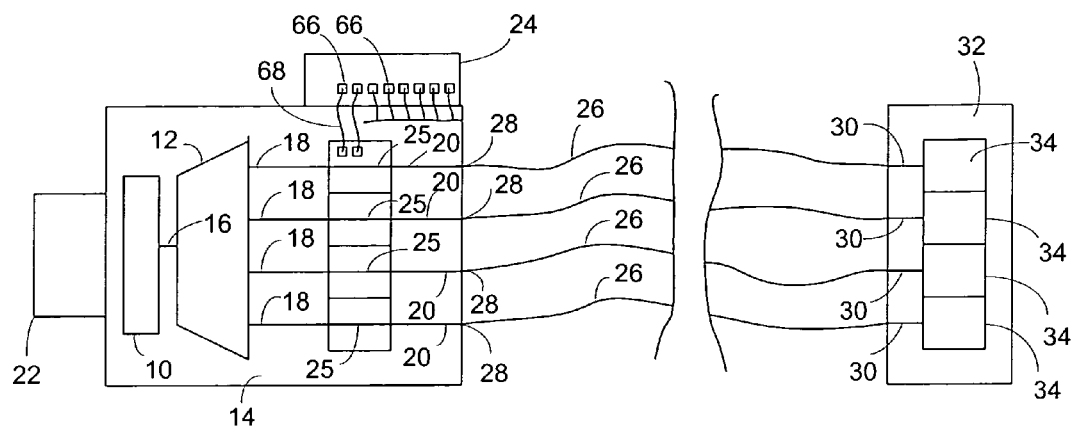
FIG. 1A is a schematic of a system that includes an optical transmitter and a receiver.

FIG. 1A is a schematic of a system that includes an optical transmitter and a receiver. The transmitter includes multiple waveguides, one or more lasers 10, a splitter 12, and modulators positioned on a common platform 14. The waveguides include one or more source waveguides 16, transition waveguides 18, and output waveguides 20.

The system also includes laser driver electronics 22. Although not shown in FIG. 1A, the laser driver electronics 22 are in electrical communication with the one or more lasers 10 and are configured to operate the one or more lasers 10 such that each of the lasers 10 generates and outputs a light signal. The system also includes modulator driver electronics 24. The modulator driver electronics 24 are in electrical communication with each of the modulators and are configured to operate the modulators such that the modulators modulate the intensity of a light signal being guided through the modulator. Although FIG. 1A shows the laser driver electronics 22 and modulator driver electronics 24 as being separate components, the laser driver electronics 22 and modulator driver electronics 24 can be included on the same component.

During operation of the system, the laser driver electronics 22 operate the one or more lasers 10 such that they each generate a light signal. The generated light signal(s) are each received at one of the source waveguides 16. The source waveguides 16 carry the light signal(s) to the splitter 12. The splitter 12 splits the received light signal(s) into multiple transition light signals. Each of the transition light signals is received on a different one of the transition waveguides 18. Each of the transition waveguide 18 guides the received transition light signal to a different one of the modulators. The modulators each include a modulator waveguide 25 that guides the received transition light signal through the modulator. The modulator driver electronics 24 are configured to operate each of the modulator such that the transition light signal being guided through the modulator waveguide 25 is modulated into a modulated light signal. The output waveguides 20 each receives one of the modulated light signals and guides the received modulated light signals to a facet 28.

The system also includes multiple optical fibers 26 and a receiver. Each of the optical fibers 26 is aligned with a facet 28 on the transmitter so as to receive a modulated light signal from the transmitter. Each of the optical fibers 26 guides the received modulated light signal to the receiver.

The receiver includes sensor waveguides 30 positioned on a common platform 32. The sensor waveguides 30 are each aligned with one of the optical fibers 26 such that each of the sensor waveguides receives one of the modulated light signals from one of the optical fibers 26. The receiver also includes light sensors 34 positioned on the common platform 32. Each of the sensor waveguides 30 guides the received modulated light signal to one of the light sensors 34. The light sensors 34 are configured to convert the received modulated light signal to an electrical signal that is further processed by electronics (not shown) in electrical communication with the receiver.

Although FIG. 1A shows each of the optical fibers 26 routing a modulated light signal to a common receiver, the optical fibers 26 can route different modulated light signals to different receivers in different locations. As a result, the transmitter can be used to transmit modulated light signal and/or data to different locations.

Figure 1B:
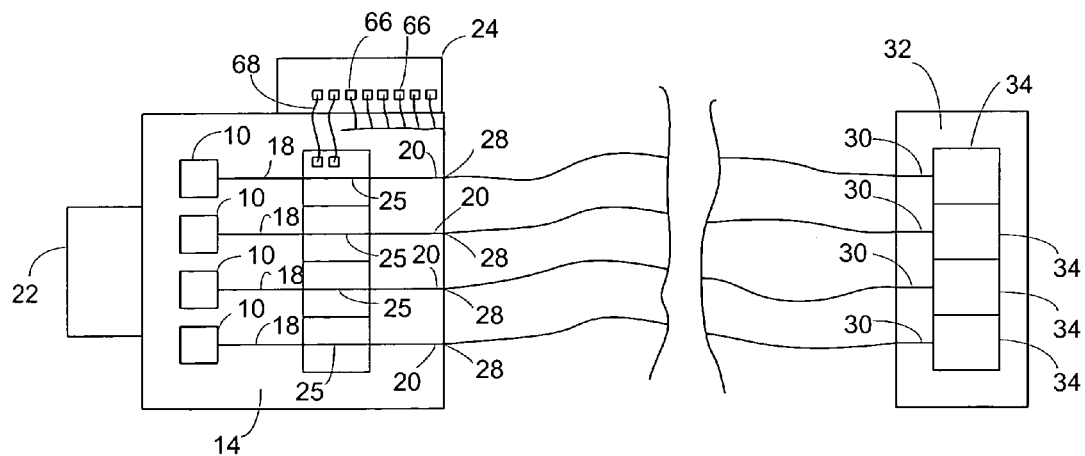
FIG. 1B is a schematic of another embodiment of a system that includes an optical transmitter and a receiver.

The transmitter can include more than one laser 10. For instance, FIG. 1B is a schematic of a system that includes an optical transmitter having multiple lasers 10. The laser driver electronics 22 operate the one or more lasers 10 such that they each generate a light signal. Different light signals can be at the same wavelength or different light signals. The generated light signal(s) are each received at a transition waveguide 18. Each of the transition waveguides 18 guides the received transition light signal to a different one of the modulators. The modulators each include a modulator waveguide 25 that guides the received transition light signal through the modulator. The modulator driver electronics 24 are configured to operate each of the modulator such that the transition light signal being guided through the modulator waveguide 25 is modulated into a modulated light signal. The output waveguides 20 each receives one of the modulated light signals and guides the received modulated light signals to a facet 28.

The system also includes multiple optical fibers 26 and a receiver. Each of the optical fibers 26 is aligned with a facet 28 on the transmitter so as to receive a modulated light signal from the transmitter. Each of the optical fibers 26 guides the received modulated light signal to the receiver.

The receiver includes sensor waveguides 30 positioned on a common platform 32. The sensor waveguides 30 are each aligned with one of the optical fibers 26 such that each of the sensor waveguides receives one of the modulated light signals from one of the optical fibers 26. The receiver also includes light sensors 34 positioned on the common platform 32. Each of the sensor waveguides 30 guides the received modulated light signal to one of the light sensors 34. The light sensors 34 are configured to convert the received modulated light signal to an electrical signal that is further processed by electronics (not shown) in electrical communication with the receiver.

Although FIG. 1B shows each of the optical fibers 26 routing a modulated light signal to a common receiver, the optical fibers 26 can route different modulated light signals to different receivers in different locations. As a result, the transmitter can be used to transmit modulated light signal and/or data to different locations.

Figure 2B:
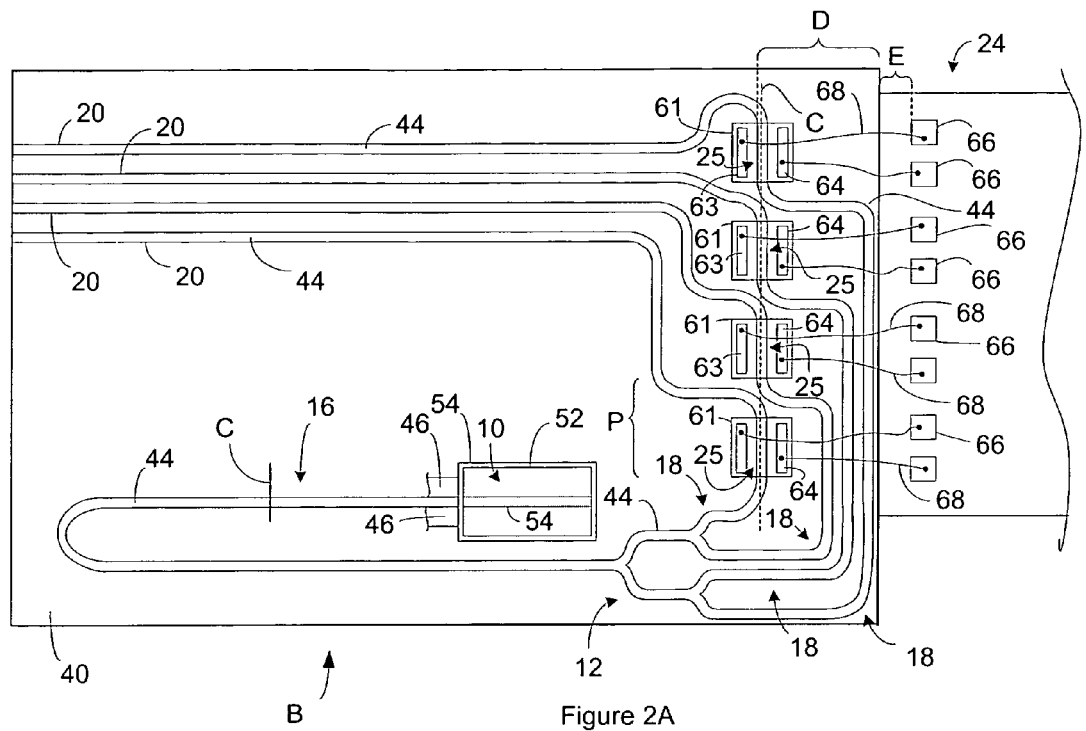
Figure 2B:
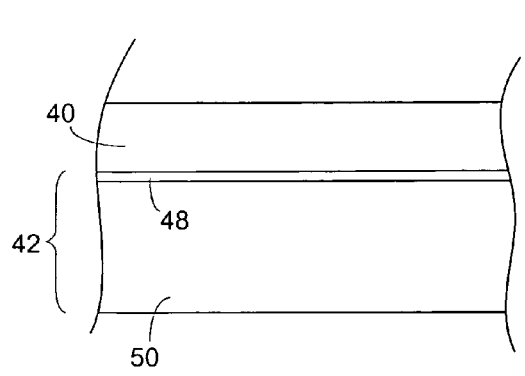
Figure 2C:
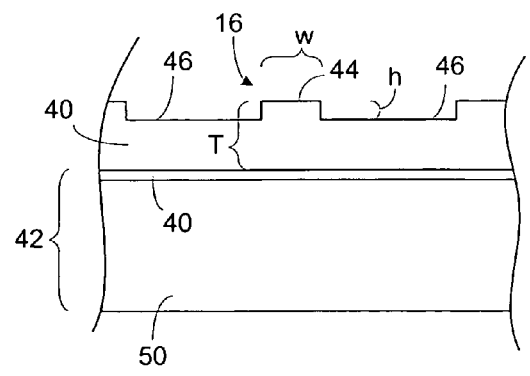

FIG. 2A through FIG. 2C illustrate a transmitter that is suitable for use as a transmitter in a system such as the system of FIG. 1A. FIG. 2A is a topview of the transmitter. FIG. 2B is a sideview of the transmitter taken looking in the direction of the arrow labeled B in FIG. 2A. FIG. 2C is a cross-section of the transmitter taken along the line labeled C in FIG. 2A. The transmitter is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of a substrate included in the base, and/or the bottom side of the substrate.

A suitable platform for building a transmitter according to FIG. 2A through FIG. 2C includes a light-transmitting medium 40 positioned on a base 42. The waveguides guide the different light signals through the light-transmitting medium 40. FIG. 2C is a cross-section of a source waveguide 16; however, the transition waveguides 18 and output waveguides 20 can also be constructed as shown in FIG. 2C. The light-transmitting medium 40 includes a ridge 44 defined by trenches 46 that extend into the light-transmitting medium 40 on opposing sides of the ridge 44. In FIG. 2A, only the portion of the trench 46 adjacent to the laser 10 is shown for the purposes of simplifying the illustration. The ridge 44 defines an upper portion of the waveguide. Accordingly, the waveguides include a ridge 44 of the light-transmitting medium 40 extending upward from slab regions of the light-transmitting medium 40 located on opposing sides of the ridge 44.

The portion of the base 42 adjacent to the light-transmitting medium 40 is configured to reflect light signals being guided in the ridge 44 back into the ridge 44 in order to constrain light signals in the waveguide. For instance, the portion of the base 42 adjacent to the first light-transmitting medium 40 can be an optical insulator 48 with a lower index of refraction than the light-transmitting medium 40. The drop in the index of refraction can cause reflection of a light signal from the light-transmitting medium 40 back into the light-transmitting medium 40. The base 42 can include the optical insulator 48 positioned on a substrate 50.

In one example, the platform is a silicon-on-insulator wafer. A silicon-on-insulator wafer includes a silicon layer positioned on a base 42. The layer of silicon serves as the light-transmitting medium 40. The base 42 of the silicon-on-insulator wafer also includes a layer of silica positioned on a silicon substrate. The layer of silica serves as the optical insulator 48 while the silicon substrate serve as a substrate 50 for the base 42.

The transmitter includes a laser chip 52. The illustrated laser chip 52 includes a single laser 10 although it is possible to build the transmitter that makes use of multiple lasers. Suitable lasers 10 include Fabry-Perot lasers. The laser 10 includes a ridge 54 that extends upwards from a platform and at least partially defines a laser waveguide on the laser chip 52. The laser chip 52 is positioned in a recess 56 that extends into at least the light-transmitting medium 40. In some instances, the recess 56 extends into the base 42. The laser chip 52 is inverted in that the ridge 54 defining the laser waveguide is positioned between the platform of the laser chip 52 and the base 42 of the transmitter. Accordingly, the location of the ridge 54 is shown by dashed lines in FIG. 2A. Laser driver electronics 22 (not show) are in electrical communication with the laser 10 and are configured to operate the laser 10 such that the laser 10 generates and outputs a light signal.

The laser chip 52 is placed in the recess 56 such that the laser 10 is aligned with the source waveguide 16. As a result, during operation of the transmitter, the source waveguide 16 receives the light signal output by the laser 10. Suitable methods, structures, and configurations for mounting a laser chip 52 on a silicon-on-insulator 48 wafer with the proper alignment are disclosed in U.S. patent application Ser. No. 08/853, 104, filed on May 8, 1997, entitled "Assembly of an Optical Component and an Optical Waveguide, now issued as U.S. Pat. No. 5,881,190, and also in U.S. patent application Ser.

No. 12/215,693, filed on Jun. 28, 2008, entitled "Interface Between Light Source and Optical Component," each of which is incorporated herein in its entirety. The method of fabrication, operation, and mounting disclosed in U.S. patent application Ser. No. 08/853,104 and/or 12/215,693 can be used in conjunction with the transmitter of FIG. 1A through FIG. 2C.

The splitter 12 need not be a wavelength dependent splitter 12. For instance, FIG. 2A shows the source waveguide 16 guiding the light signal to a series of y-junctions that serve as the splitter 12. Y-junctions are example of splitters 12 that do not split up an incoming light signal into transition light signals that each has a different selection of wavelengths. Other examples of suitable wavelength independent splitters 12 include, but are not limited to, Multimode Interference couplers (MMIs), and directional couplers. In some instances, the splitter 12 is a wavelength dependent splitter 12 that splits the incoming source signal into transition light signals that each has a different selection of wavelengths. Examples of suitable wavelength dependent splitters 12 include, but are not limited to, arrayed waveguide gratings, echelle gratings, and bragg gratings.

The transmitter includes modulators positioned along an edge of the transmitter. The transition waveguides 18 each guides one of the transition light signals to a different one of the modulators. In order to simplify FIG. 2A, the details of the modulator construction are not shown in FIG. 2A. However, the modulator construction is evident from other illustrations such as FIG. 3A through FIG. 3C. The modulators each include a modulator waveguide 25 configured to guide the received transition light signal through an electro-absorption medium 61. For instance, a ridge 60 of the electro-absorption medium 61 can extend upward from slab regions 62 of the electro-absorption medium 61. Accordingly, the modulator waveguides 25 are each partially defined by the top and lateral sides of the ridge 60 of the electro-absorption medium 61.

The modulators each include a first contact pad 63 and a second contact pad 64 for providing electrical communication between the modulator and the modulator driver electronics 24. The modulator driver electronics 24 can be "off board" as shown in FIG. 2A. For instance, the modulator driver electronics 24 can be included on a component that is in addition to and/or separate from the transmitter and the additional component can be positioned adjacent to the transmitter as shown in FIG. 2A. This "off board" arrangement is in contrast to the "on board" arrangements where the modulator driver electronics 24 are integrated directly onto the transmitter or are included on a flip chip bonded on the top of the transmitter.

The modulator driver electronics 24 can also include drive pads 66. Suitable drive pads 66 include contact pads. An electrical conductor such as a wire 68 can provide electrical communication between the first contact pad 63 and the second contact pad 64 of a modulator and the drive pads 66. An electrical conductor such as a wire 68 can be connected to the first contact pad 63 and the second contact pad 64 of a modulator and the drive pads 66 using technologies such as wire bonding.

The modulator driver electronics 24 are configured to apply electrical energy to the drive pads 66 such that an electrical field is formed in the modulator waveguide 25. The modulator driver electronics 24 vary the electrical field so as to modulate the transition light signal traveling through the modulator waveguide 25. This modulation of the transition light signal results in the generation of a modulated light signal that exits from the modulator. The modulator driver electronics 24 can modulate each of the transition light signals such that different modulated light signal are the same or different. For instance, different modulated light signals can be modulated at different frequencies or at the same frequency. Further, different modulated light signals can be modulated to include different data or the same data.

The modulated light signals are each received by one of the output waveguides 20. The output waveguides 20 each guides one of the modulated light signals to a facet 28 through which the modulated light signal can exit the transmitter.

The length of the electrical path from the drive pads 66 to the location where the electrical field is formed in the modulator waveguide 25 (the drive path length) affects the speed at which the modulators are able to modulate the modulated light signal. For instance, increasing the drive path length for the first contact pad 63 and/or the second contact pad 64 associated with a single modulator reduces the modulation speeds that are possible for a given power level. It is generally desirable to modulate the modulated light signal in the RF range (frequency in a range of 3 kHz to 400 GHz). For communications applications, it is generally desirable to modulate the modulated light signal in a range of 100 MHz to 400 GHz. However, the Applicant has found that in order to effectively modulate a modulated light signal at a rate of 25 GHz, the drive path length for the first contact pad 63 and the second contact pad 64 both need to be less than 1 mm.

It becomes more difficult to achieve the require drive path lengths as the number of modulators on the transmitter increases. For instance, increasing the number of modulators can be achieved by staggering the locations of the modulators on the transmitter. Staggering the locations of the modulators means the drive path lengths will be different for different modulators and that the drive path length can become undesirably large as the number of modulators increases. The arrangement of FIG. 2B overcomes these challenges. The modulators are positioned along an edge of the transmitter in order to reduce the distance between the modulators and the modulator driver electronics 24. This reduced distance shortens the drive path lengths. In some instances, the modulators are arranged such that the distance between the edge of the transmitter and the furthest point of each modulator waveguide 25 (labeled D in FIG. 2A) is less than 1 mm, 0.5 mm, or 0.25 mm. In cases where the modulator waveguides 25 are partially defined by a ridge 60 extending upward from slab regions 62, the furthest point of each modulator waveguide 25 is the furthest portion of the ridge 60 from the edge of the transmitter.

The modulators are lined up along the edge of the transmitter. For instance, the modulator waveguides 25 are arranged so the direction of light signal propagation through each modulator waveguide 25 is parallel to a common line (labeled C in FIG. 2A). Accordingly, the length of each modulator waveguide 25 is also parallel to the common line. Additionally, the modulator waveguides 25 are arranged so that common line can concurrently pass through each of the modulator waveguides 25. Further, the modulator waveguides 25 are arranged so the common line can concurrently pass through the same location in each of the modulator waveguides 25. For instance, the common line can concurrently pass through the left side of the ridge 60 that defines each of the modulator waveguides 25 or the common line can concurrently pass through the right side of the ridge 60 that defines each of the modulator waveguides 25. Alternately, the common line can concurrently pass through the center of the ridge 60 that defines each of the modulator waveguides 25. In this arrangement, the modulator waveguides 25 are optically aligned. For instance, the modulated light signal that exited from the lowest modulator shown in FIG. 2A would pass through each of the modulator waveguides 25 in the line of modulators if there were not other components (other waveguides) between those modulators that interfered with the path of the modulated light signal.

When the modulators are lined up along the edge, the distance between the first contact pad 63 and the edge of the transmitter remains the same for each of the different modulators and the distance between the second contact pad 64 and the edge of the transmitter remains the same for each of the different modulators as is evident from FIG. 2A. As a result, the drive path lengths for the different modulators can be substantially constant. For instance, the drive pads 66 on the modulator driver electronics 24 can be arranged such that each drive pads 66 is about the same distance from an edge of the modulator driver electronics 24 as shown in FIG. 2A. As a result, the drive path length for each of the first contact pads 63 is about the same and the drive path length for each of the first contact pads 63 is about the same.

The distance between the drive pads 66 and the edge of the modulator driver electronics 24 can also affect the drive path length as is evident from FIG. 2A. The distance between the drive pads 66 and the edge of the modulator driver electronics 24 (labeled E in FIG. 2A) is typically less than 300 µm, or 100 µm, or 10 µm. Although the modulator driver electronics 24 are "off board" and are a separate component from the transmitter, the edge of the modulator driver electronics 24 can be substantially parallel to the edge of the transmitter. In some instances, the edge of the modulator driver electronics 24 contacts the edge of the transmitter and is parallel to the edge of the transmitter as is shown in FIG. 2A. The modulator driver electronics 24 can optionally be immobilized relative to the transmitter. For instance, the modulator driver electronics 24 can optionally be epoxied to the transmitter In FIG. 2A, a portion of the modulators include transition waveguides 18 located between the modulator and the edge of the transmitter that is closest to the modulators. These transition waveguides 18 can alternately be positioned on the opposing side of the modulators; however, these transition waveguides 18 would then cross one or more output waveguides 20 before being connected to the desired modulator. Since waveguide intersections are a source of optical loss, the arrangement of FIG. 2A may be more desirable.

Although the transmitter of FIG. 2A is shows with four modulators, the transmitter can include other numbers of modulators and the associated waveguides. In some instances, the transmitter includes more than three modulators arranged as shown in FIG. 2A or more than more than five modulators arranged as shown in FIG. 2A.

A schematic of the transmitter of FIG. 2A is in accordance with FIG. 1A; however, the transmitter of FIG. 2A can be modified to have a schematic in accordance with FIG. 1B by replacing the single laser 10, source waveguide 16, and splitter 12 of FIG. 2A with multiple different lasers.

Figure 3A:
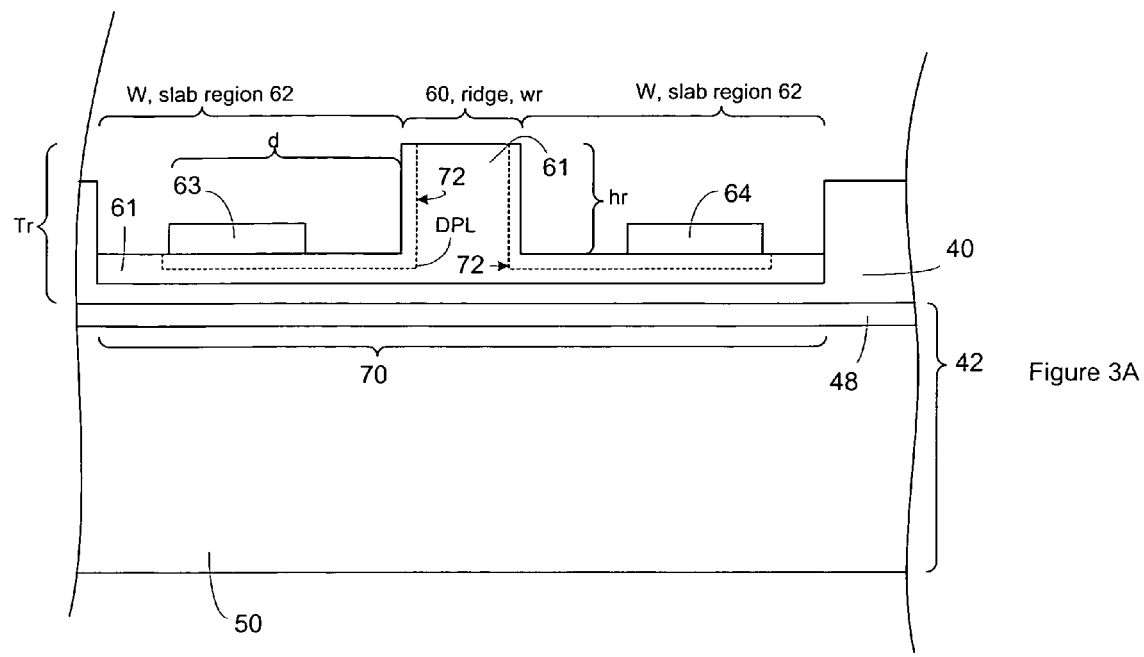
FIG. 3A through FIG. 3C are each a cross section of a modulator that is suitable for use as the transmitters of FIG. 1A through FIG. 2C.

Suitable modulators for satisfying the above size limitations are Franz-Keldysh modulators. Accordingly, in some instances the modulators shown in FIG. 2A are each a Franz-Keldysh modulator. FIG. 3A is a cross section of a Franz-Keldysh modulator that can serve as the modulators of FIG. 2A through FIG. 2C. As will become evident from the following discussion, the modulator includes multiple doped regions 72. In the cross section of FIG. 3A, the perimeter of portions of the doped regions 72 are illustrated with dashed lines to prevent them from being confused with interfaces between different materials. The interfaces between different materials are illustrated with solid lines. The modulator is configured to apply an electric field to the electro-absorption medium 61 in order to intensity modulate the transition light signals received by the modulator.

A ridge 60 of electro-absorption medium 61 extends upward from a slab region 62 of the electro-absorption medium 61. Accordingly, the modulator waveguide 25 is partially defined by the top and lateral sides of the ridge 60 of electro-absorption medium 61. The slab regions 62 of the electro-absorption medium 61 and the ridge 60 of the electro-absorption medium 61 are both positioned on a seed portion 70 of the light-transmitting medium 40. As a result, the seed portion 70 of the light-transmitting medium 40 is between the electro-absorption medium 61 and the base 42. In some instances, the seed portion 70 of the light-transmitting medium 40 is continuous with the portion of the light-transmitting medium 40 included in the transition waveguide 18 from which the modulator receives the transition light signals. In these instances, when a transition light signal travels from a transition waveguide 18 into the electro-absorption medium 61, a portion of the transition light signal enters the seed portion 70 of the light-transmitting medium 40 and another portion of the transition light signal enters the electro-absorption medium 61. Accordingly, the seed portion 70 of the light-transmitting medium 40 is included in the modulator waveguide 25 in the sense that the modulator waveguide 25 extends from the base 42 to the top of the ridge 60 of the electro-absorption medium 61. During fabrication of the modulator, the electro-absorption medium 61 can be grown on the seed portion 70 of the light-transmitting medium 40.

Doped regions 72 are both in the slab regions 62 of the electro-absorption medium 61 and also in the ridge 60 of the electro-absorption medium 61. For instance, doped regions 72 of the electro-absorption medium 61 are positioned on the lateral sides of the ridge 60 of the electro-absorption medium 61. In some instances, each of the doped regions 72 extends up to the top side of the electro-absorption medium 61 as shown in FIG. 3A. Additionally, the doped regions 72 extend away from the ridge 60 into the slab region 62 of the electro-absorption medium 61. The transition of a doped region 72 from the ridge 60 of the electro-absorption medium 61 into the slab region 62 of the electro-absorption medium 61 can be continuous and unbroken as shown in FIG. 3A.

Each of the doped regions 72 can be an N-type doped region 72 or a P-type doped region 72. For instance, each of the N-type doped regions 72 can include an N-type dopant and each of the P-type doped regions 72 can include a P-type dopant. In some instances, the electro-absorption medium 61 includes a doped region 72 that is an N-type doped region 72 and a doped region 72 that is a P-type doped region 72. The separation between the doped regions 72 in the electro-absorption medium 61 results in the formation of PIN (p-type region-insulator 48-n-type region) junction in the modulator.

In the electro-absorption medium 61, suitable dopants for N-type regions include, but are not limited to, phosphorus and/or arsenic. Suitable dopants for P-type regions include, but are not limited to, boron. The doped regions 72 are doped so as to be electrically conducting. A suitable concentration for the P-type dopant in a P-type doped region 72 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region 72 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

The first contact pad 63 and the second contact pad 64 are each positioned on the slab region 62 of the electro-absorption medium 61. In particular, the first contact pad 63 and the second contact pad 64 each contact a portion of a doped region 72 that is in the slab region 62 of the electro-absorption medium 61. Accordingly, the each of the doped regions 72 is doped at a concentration that allows it to provide electrical communication between an electrical conductor and one of the doped regions 72 in the electro-absorption medium 61. As a result, the modulator driver electronics 24 can apply electrical energy to the first contact pad 63 and the second contact pad 64 in order to apply the electric field to the electro-absorption medium 61.

During operation of the modulators of FIG. 3A, the modulator driver electronics 24 apply electrical energy to the first contact pad 63 and the second contact pad 64 so as to form an electrical field in the electro-absorption medium 61. For instance, the electronics can form a voltage differential between the doped regions 72. The electrical field can be formed without generating a significant electrical current through the electro-absorption medium 61. The electro-absorption medium 61 can be a medium in which the Franz-Keldysh effect occurs in response to the application of the electrical field. The Franz-Keldysh effect is a change in optical absorption and optical phase by an electro-absorption medium 61. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the electro-absorption medium 61 can absorb light signals received by the electro-absorption medium 61 and increasing the electrical field increases the amount of light absorbed by the electro-absorption medium 61. Accordingly, the electronics can tune the electrical field so as to tune the amount of light absorbed by the electro-absorption medium 61. As a result, the electronics can intensity modulate the electrical field in order to modulate the light signal. Additionally, the electrical field needed to take advantage of the Franz-Keldysh effect generally does not involve generation of free carriers by the electric field.

Suitable electro-absorption media 61 include semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

Additional details about the fabrication, structure, incorporation into an optical device such as the transmitter, and operation of a modulator having a cross section according to FIG. 3A can be found in U.S. patent application Ser. No. 12/653,547, filed on Dec. 15, 2009, entitled "Optical Device Having Modulator Employing Horizontal Electrical Field," and incorporated herein in its entirety.

Figure 3B:
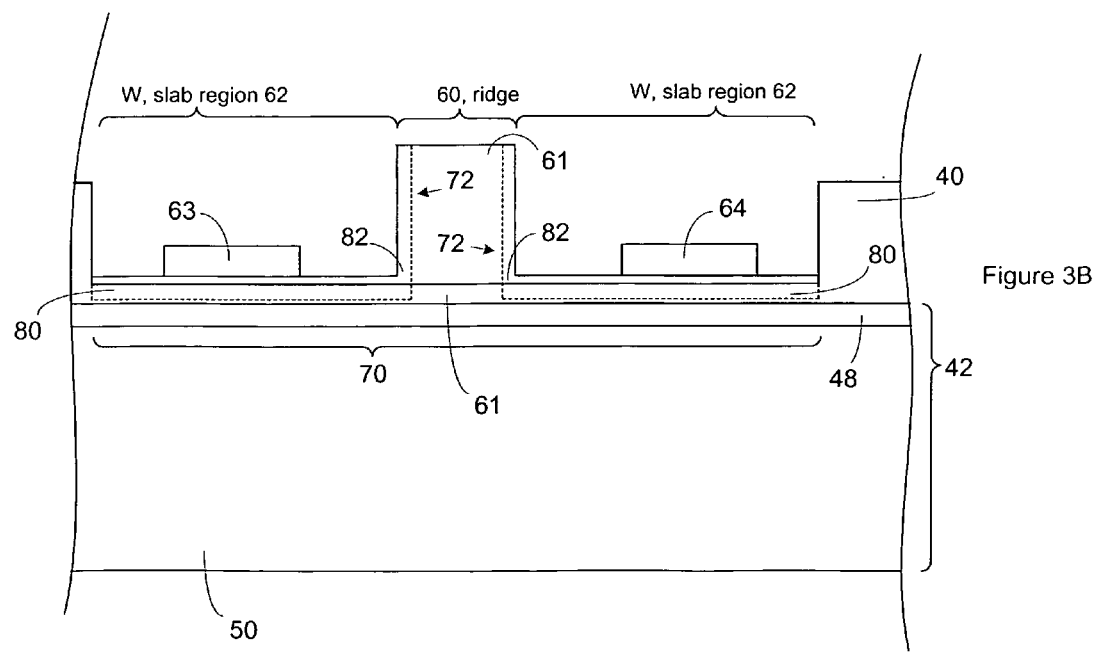

The modulator of FIG. 3A can be modified as shown in FIG. 3B. FIG. 3B is a cross section of another embodiment of a suitable Franz-Keldysh modulator. The perimeter of portions of doped regions 72 shown in FIG. 3A are illustrated with dashed lines to prevent them from being confused with interfaces between different materials. The interfaces between different materials are illustrated with solid lines. A first doped zone 80 and a second doped zone 82 combine to form each of the doped regions 72. In some instance, the first doped zone 80 is located in the light-transmitting medium 40 but not in the electro-absorption medium 61 and the second doped zone 82 is located in the electro-absorption medium 61. The first doped zone 80 can contact the second doped zone 82 or can overlap with the second doped zone 82. In some instances, the first doped zone 80 and the second doped zone 82 overlap and at least a portion of the overlap is located in the light-transmitting medium 40. In other instances, the first doped zone 80 and the second doped zone 82 overlap without any overlap being present in the electro-absorption medium 61.

The first doped zone 80 and the second doped zone 82 included in the same doped region 72 each includes the same type of dopant. For instance, the first doped zone 80 and the second doped zone 82 in an n-type doped region 72 each includes an n-type dopant. The first doped zone 80 and the second doped zone 82 included in the same doped region 72 can have the same dopant concentration or different concentrations.

Although FIG. 3A and FIG. 3B illustrates the slab regions 62 of the electro-absorption medium 61, the slab regions 62 of the electro-absorption medium 61 may not be present. For instance, the etch that forms the slab regions 62 of the electro-absorption medium 61 may etch all the way through the slab regions 62. In these instances, the first doped zone 80 and second doped zone 82 are both formed in the light-transmitting medium 40.

Although FIG. 3B shows the first doped zone 80 not extending down to the optical insulator 48, the first doped zone 80 can extend down to the optical insulator 48 or into the optical insulator 48.

Figure 3C:
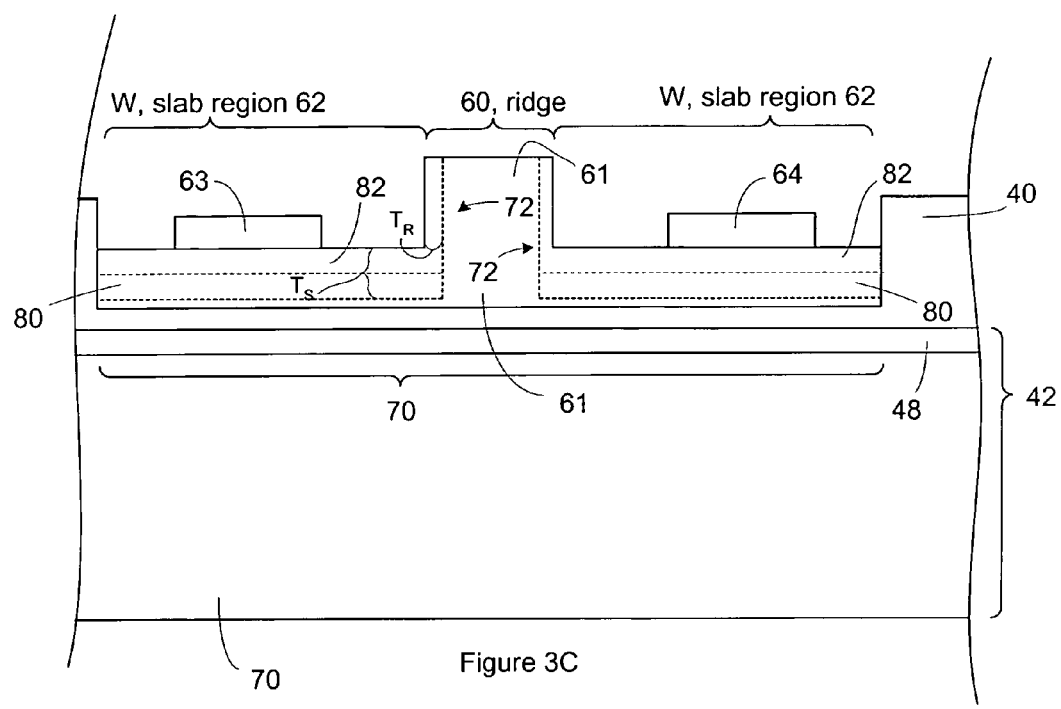

The modulator of FIG. 3A can be modified as shown in FIG. 3C. FIG. 3C presents another embodiment of a suitable Franz-Keldysh modulator. The perimeter of portions of doped regions 72 shown in FIG. 3C are illustrated with dashed lines to prevent them from being confused with interfaces between different materials. The interfaces between different materials are illustrated with solid lines.

The doped regions 72 each includes a portion that extends into the ridge 60 of electro-absorption medium 61 and another portion that extends into the slab region 62 of the electro-absorption medium 61. The doped region 72 extends further into the slab region 62 of the electro-absorption medium 61 than the doped region 72 extends into the ridge 60 of the electro-absorption medium 61. For instance, the portion of each doped region 72 in the slab region 62 of the electro-absorption medium 61 is thicker than the portion in the ridge 60. Reducing the extension of the doped region 72 into the ridge 60 reduces the interaction between the doped region 72 and a light signal being guided through the ridge 60. As a result, a reduced extension of the doped region 72 into the ridge 60 reduces optical loss. Extending the doped region 72 further into the slab regions 62 allows the electrical field formed between the doped regions 72 to move closer to the base 42. As a result, the extension of the doped regions 72 further into the slab increases the portion of the light signal that interacts with the electrical field. Accordingly, problems associated with increasing the thickness of the slab regions 62 do not arise because they can be addressed by extending the doped regions 72 further into the slab regions 62.

A suitable thickness for the portion of the doped region 72 in the ridge 60 (labeled $T_R$ in FIG. 3C) includes a thickness greater than 0.01, 0.075, 0.1, or 0.125 µm and/or less than 0.175, 0.2, or 0.5 µm. A suitable thickness for the portion of the doped region 72 40 in the slab region 62 of the electro-absorption medium 61 27 (labeled $T_S$ in FIG. 3C) includes a thickness greater than 0.175, 0.2, or 0.225 µm and/or less than 0.275, 0.3, 0.325, or 0.8 µm. A suitable thickness ratio (ratio of thickness of portion of doped region 72 in the slab region 62: thickness of portion of doped region 72 in the ridge 60) includes ratios greater than 1, 1.25, or 1.5 and/or less than 2.0, 2.5, and 3.

The doped regions 72 can each be a result of combining a first doped zone 80 (not shown in FIG. 3C) and a second doped zone 82 (not shown in FIG. 3C). The first doped zone 80 can be located in the slab region 62 of the electro-absorption medium 61 and the second doped zone 82 can be located both in the ridge 60 and in the slab region 62 of the electro-absorption medium 61. The first doped zone 80 and the second doped zone 82 included in the same doped region 72 each includes the same type of dopant. For instance, the first doped zone 80 and the second doped zone 82 in an n-type doped region 72 each includes an n-type dopant. The first doped zone 80 and the second doped zone 82 included in the same doped region 72 can have the same dopant concentration or different concentrations. Additionally, the first doped zone 80 can contact the second doped zone 82 so as to form the doped region 72 or can overlap with the second doped zone 82 so as to form the doped region 72. In some instances, the first doped zone 80 and the second doped zone 82 overlap and at least a portion of the overlap is located in slab region 62 of the electro-absorption medium 61.

Although FIG. 3C shows the doped region 72 not extending down to the optical insulator 48, the doped region 72 can extend down to the optical insulator 48 or into the optical insulator 48.

The modulator driver electronics 24 can operate the Franz-Keldysh modulators of FIG. 3B and FIG. 3C in a manner that is analogous to the operation of the Franz-Keldysh modulators of FIG. 3A. Additional details about the fabrication, structure, incorporation into an optical device such as the transmitter, and operation of a modulator having a cross section according to FIG. 3A through FIG. 3C can be found in U.S. patent application Ser. No. 13/385,099, filed on Feb. 1, 2012, entitled "Optical Component Having Reduced Dependency on Etch Depth," and incorporated herein in its entirety.

The modulators of FIG. 3A through FIG. 3C are suitable for use as the modulators of FIG. 2A because of their compact size. For instance, the width of the slab regions 62 in each of FIG. 3A through FIG. 3C (labeled W, slab region) can be less than 40 µm, 30 µm, or 20 µm. Additionally or alternately, the distance between the outermost end of the contact pad and the ridge 60 of the electro-absorption medium 61 (labeled d in FIG. 3A) can be less than 40 µm, 30 µm, or 10 µm. These small dimensions allow these modulators to have a very close proximity to other features on the transmitter. For instance, these dimension allow the modulators to be positioned near the edge of the transmitter. The ability to position these modulators near the edge of the transmitter makes it possible to achieve the small drive path lengths disclosed above. Another example of transmitter features that can be positioned close to these modulators are transition waveguides 18. As discussed above, a portion of the modulators include transition waveguides 18 located between the modulator and the edge of the transmitter that is closest to the modulators. The ability to place the modulators close to these transition waveguides 18 increases the number of transition waveguides 18 that can be positioned between the edge and the modulators without affecting the modulation speed.

Modulator types other than Franz-Keldysh modulators can be employed in the above transmitter. However, where Franz-Keldysh modulators directly modulate intensity, many other modulator types modulate phase and are accordingly incorporated into a Mach-Zehnder interferometer in order to modulate intensity. Modulators that manipulate a depletion region in a waveguide are an example of a phase modulator that is typically incorporated into a Mach-Zehnder interferometer. Since the waveguides associated with a Mach-Zehnder interferometer require more space on the transmitter than a Franz-Keldysh modulator, the Franz-Keldysh modulator may provide a more compact transmitter. For instance, the length of the Franz-Keldysh modulators can be selected such that a distance from a location on one of the modulators to the same location on the next modulator (labeled P) in FIG. 2A is less than 2 mm, 1 mm, or 0.5 mm.

In the modulators of FIG. 3A through FIG. 3C, the region of the light-transmitting medium 40 or electro-absorption medium 61 between the doped regions 72 can optionally be undoped or lightly doped as long as the doping is insufficient for the doped material to act as an electrical conductor that electrically shorts the modulator.

In the modulators of FIG. 3A through FIG. 3C, the electrical field is essentially formed between the portions of the doped region 72 located in the ridge 60 of the electro-absorption medium 61. As a result, the drive path length extends from the drive pads 66 to the location where the doped region 72 of the active ends under the ridge 60. For instance, in the modulator of FIG. 3A, one of the drive path lengths extends from one of the drive pads 66 to the location labeled DPL. In the case shown in FIG. 3A, the drive path length consists of the length of the wire 68 from the drive pad 66 to the contact pad and the distance between the location where the wire 68 is bonded to the contact pad to the location labeled DPL.

Although FIG. 2A through FIG. 3C illustrate the first contact pad 63 being positioned on an opposite side of the ridge 60 of the electro-absorption medium 61 from the second contact pad 64, the first contact pad 63 and the second contact pad 64 can be positioned on the same side of the ridge 60 of the electro-absorption medium 61. In these instances, the transmitter can include a metal trace that extends from one of the contact pads, across the ridge 60 of the electro-absorption medium 61 and/or across the ridge 44 of light-transmitting medium 40, and into contact with the doped region 72 on that side of the ridge 60 of the electro-absorption medium 61. Accordingly, the metal trace provides electrical communication between a contact pad on one side of the modulator waveguide 25 and a doped region 72 on the other side of the modulator waveguide 25. In these instances, the metal trace is part of the drive path length. As a result, the length of the metal trace can affect the modulation speed.

In one example of the transmitter, the waveguides (source waveguides 16, transition waveguides 18 and output waveguides 20) are single mode waveguides. The single mode waveguides can also be large core single mode waveguides. For instance, each of the source waveguides 16, transition waveguides 18 and output waveguides 20 can have a cross section according to FIG. 2C and can have a ridge 44 width (labeled w in FIG. 2C) greater than 1 µm or 2 µm and/or less than 4 µm or 5 µm, a ridge 44 height (labeled h in FIG. 2C) greater than 0.5 µm or 1 µm and/or less than 2 µm or 2.5 µm, and a thickness (labeled T in FIG. 2C) greater than 1 µm or 2 µm and/or less than 4 µm or 5 µm. In this same example of the transmitter, the modulators can each be constructed according to FIG. 3A, FIG. 3B, or FIG. 3C with a modulator waveguide 25 having a ridge 60 width (labeled wr in FIG. 3A) greater than 0.2 µm or 0.4 µm and/or less than 0.8 µm or 1 µm, a ridge 60 height (labeled hr in FIG. 3A) greater than 1 μm or 2 μm and/or less than 2.8 μm or 3 μm, and a waveguide thickness (labeled Tr in FIG. 2C) greater than 1 μm or 2 μm and/or less than 4 μm or 5 μm.

Using the above transmitter construction and the above modulators, the transmitter and modulator driver electronics 24 can be constructed so as to provide drive path lengths less than 1 mm, 0.5 mm, or 0.25 mm.

The transmitter can include components in addition to the components shown in FIG. 1A through FIG. 2C. For instance, the transmitter can include a tap or tap waveguide configured to tap off a portion of one of the light signals (transition signal, source signal, modulated signal). The transmitter can also include a light sensor or monitor that receives the tapped portion of the light signal. The light sensor or monitor can convert the received light signal to an electrical signal. Electronics can use the electrical signal to adjust the intensity of light being generated by the one or more lasers 10 in a feedback loop. In one example, the transmitter is constructed according to FIG. 2A and a tap waveguide taps off a portion of the light signal from the source waveguide 16. The tap waveguide guides the tapped portion of the light signal to a light sensor and electronics adjust the output from the laser 10 in response to output from the light sensor. Additionally or alternately, the transmitter can include a combiner or multiplexer. For instance, the transmitter can include a combiner or multiplexer that combines two or more of the modulated signals into a single output signal that is processed further by the transmitter and/or is received by an optical fiber 26. In one example, the transmitter of FIG. 2B includes a multiplexer that combines multiple modulated signals into an output signal that is an optical fiber 26. In this instance, the lasers 10 that are the source of the combined modulated signals can each have a different wavelength so the output signal can be demuliplexed later.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
a transmitter having waveguides defined in a layer of light-transmitting medium positioned on a base, the waveguide being immobilized relative to the base along the length of the waveguide;
a portion of the waveguides being transition waveguides that each guides a different transition light signal;
modulators positioned on the base,
each modulator including a modulator waveguide that receives one of the transition light signals and guides the received transition light signal through the modulator,
drive electronics in electrical communication with the modulators and configured to apply electrical energy to each of the modulators such that an electrical field is generated within the modulator waveguide, each of the electrical fields being generated so as to modulate one of the transition light signals into a modulated signal,
a drive path length being a length of an electrical path from a contact pad on the drive electronics to a location where the electrical field is formed in one of the modulator waveguides, the drive path lengths for each of the modulators being less than 1.0 mm.

2. The system of claim 1, wherein the modulators are arranged such that the distance between a lateral edge of the transmitter and the furthest point of each modulator waveguide is less than 0.5 mm.

3. The system of claim 1, wherein each of the drive paths includes a wire that provides electrical communication between one of the pads on the drive electronics and a contact pad included in one of the modulator.

4. The system of claim 1, wherein the drive electronics are configured to modulate each of the transition light signal at a rate of at least 25 GHz.

5. The system of claim 1, wherein the modulators are arranged such that a distance from a location on one of the modulators to the same location on the next modulator is less than 2 mm.

6. The system of claim 1, wherein the modulators are lined up on the base such that a line that is parallel to a direction of propagation of each modulator waveguide can concurrently extend through each of the modulators.

7. The system of claim 1, wherein the modulators are arranged such that the distance between a lateral edge of the transmitter and the furthest point of each modulator waveguide is less than 1 mm,
each of the drive paths includes a wire that provides electrical communication between one of the pads on the drive electronics and a contact pad included in one of the modulator,
the drive electronics are configured to modulate each of the transition light signal at a rate of at least 25 GHz,
the modulators are lined up on the base such that a line that is parallel to a direction of propagation of each modulator waveguide can concurrently extend through each of the modulator waveguides, and
a distance from a location on one of the modulators to the same location on the next modulator is less than 2 mm.

8. The system of claim 1, wherein the drive electronics are a separate component from the transmitter.

9. The system of claim 1, wherein the modulator waveguides are each partially defined by a ridge of an electro-absorption medium extending upwards from slab regions of the electro-absorption medium located on opposing sides of the ridge,
a doped region extending into a lateral side of the ridge of the electro-absorption medium and also extending into one of the slab regions of the ridge of the electro-absorption medium.

10. The system of claim 9, wherein the ridge of electro-absorption medium is positioned on a portion of the layer of light-transmitting medium located between the ridge and the base.

11. The system of claim 10, wherein the doped region extends into the layer of light-transmitting medium.

12. The system of claim 1, wherein an edge of the drive electronics is substantially parallel to an edge of the transmitter.

13. The system of claim 3, wherein the edge of the drive electronics contacts the edge of the drive electronics.

14. The system of claim 1, wherein the layer of light-transmitting medium is not positioned between the drive electronics and the base.

15. The system of claim 1, wherein the drive path lengths are less than 0.5 mm.

16. The system of claim 1, wherein one or more transition waveguides pass between a portion of the modulators and the edge of the transmitter closest to the portion of the modulators.

17. The system of claim 1, wherein the light-transmitting medium is silicon.

18. The system of claim 1, wherein the modulators are arranged such that a distance between a lateral edge of the transmitter and a furthest point of each modulator waveguide is the same.

\* \* \* \* \*